(12) United States Patent
Peuker et al.

(10) Patent No.: US 11,913,840 B2
(45) Date of Patent: Feb. 27, 2024

(54) MEASURING INSERT HAVING A PROTECTIVE TUBE

(71) Applicant: Endress+Hauser Wetzer GmbH+Co. KG, Nesselwang (DE)

(72) Inventors: Christian Peuker, Immenstadt (DE); Pavo Vrdoljak, Nesselwang (DE); Alfred Umkehrer, Hopferau (DE)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 625 days.

(21) Appl. No.: 17/053,966

(22) PCT Filed: Apr. 12, 2019

(86) PCT No.: PCT/EP2019/059524
§ 371 (c)(1),
(2) Date: Nov. 9, 2020

(87) PCT Pub. No.: WO2019/214904
PCT Pub. Date: Nov. 14, 2019

(65) Prior Publication Data
US 2021/0270679 A1     Sep. 2, 2021

(30) Foreign Application Priority Data
May 9, 2018   (DE) ............ 10 2018 111 167.3

(51) Int. Cl.
*G01K 1/08*   (2021.01)
*G01K 1/16*   (2006.01)
*G01K 13/02*  (2021.01)

(52) U.S. Cl.
CPC .......... *G01K 1/08* (2013.01); *G01K 1/16* (2013.01); *G01K 13/02* (2013.01)

(58) Field of Classification Search
CPC ............ G01K 1/08; G01K 1/16; G01K 13/02
See application file for complete search history.

(56) References Cited

U.S. PATENT DOCUMENTS 9,091,599 B2 *  7/2015  Lukach, Jr. ............. G01K 1/16
10,976,188 B2 * 4/2021  Gaberthüel ........... G01F 1/6888
(Continued)

FOREIGN PATENT DOCUMENTS

| CN | 102047087 A | 5/2011 |
|----|-------------|--------|
| CN | 103180703 A | 6/2013 |

(Continued)

OTHER PUBLICATIONS

English machine translation of JP 2015152336 (Year: 2015).*

*Primary Examiner* — Nathaniel T Woodward
*Assistant Examiner* — Philip L Cotey
(74) *Attorney, Agent, or Firm* — Christopher R. Powers; Endress+Hauser (USA) Holding, Inc.

(57) ABSTRACT

A device for determining and/or monitoring a process variable of a medium includes a measuring insert, having a sensor element for sensing the process variable arranged in an end region of the measuring insert, and a dipping body for receiving the measuring insert which at least temporarily and/or partially protrudes into the medium and surrounds the measuring insert at least in a subregion nearest the medium. The device further includes a coupling unit introduced into the dipping body and designed to fill up an inner volume between an inner wall of the dipping body and an outer wall of the measuring insert at least in the subregion in which the sensor element is located as to ensure mechanical coupling between the dipping body and the measuring insert.

12 Claims, 2 Drawing Sheets

(56) References Cited

U.S. PATENT DOCUMENTS

| | | | | |
|---|---|---|---|---|
| 2003/0147452 | A1* | 8/2003 | Adachi | G01K 13/02 374/185 |
| 2008/0080592 | A1* | 4/2008 | Houben | G01K 7/16 374/185 |
| 2009/0296781 | A1* | 12/2009 | Weber | G01K 7/16 374/185 |
| 2012/0082181 | A1* | 4/2012 | Alnaqash | G01K 13/02 374/208 |
| 2012/0147923 | A1* | 6/2012 | Schmidt | G01K 1/16 374/158 |
| 2013/0107908 | A1* | 5/2013 | Lukach, Jr. | G01K 1/08 374/208 |
| 2017/0205294 | A1* | 7/2017 | Yoshida | G01K 7/02 |
| 2018/0087975 | A1* | 3/2018 | Ellis | G01K 11/20 |

FOREIGN PATENT DOCUMENTS

| | | |
|---|---|---|
| CN | 205719290 U | 11/2016 |
| CN | 206161183 U | 5/2017 |
| DE | 2329239 A1 | 1/1975 |
| DE | 102006034248 B3 | 10/2007 |
| DE | 102006034248 B4 | 10/2007 |
| DE | 102006048448 A1 | 4/2008 |
| DE | 102008054618 A1 | 6/2010 |
| DE | 102010030075 A1 | 12/2011 |
| DE | 112011102974 T5 | 7/2013 |
| DE | 102013114140 A1 | 6/2015 |
| DE | 102014101968 A1 | 8/2015 |
| DE | 102015112199 A1 | 2/2017 |
| DE | 112015003303 T5 | 4/2017 |
| DE | 112011102974 T5 | 6/2018 |
| EP | 2075558 A2 | 7/2009 |
| EP | 3112830 A1 | 1/2017 |
| EP | 3173756 A1 | 5/2017 |
| EP | 3264059 A1 | 1/2018 |
| JP | 11295156 A | 10/1999 |
| JP | 2010175257 A | 8/2010 |
| JP | 2015152336 A | 2/2014 |
| JP | 2015152336 A | 8/2015 |
| WO | 2010108961 A1 | 9/2010 |
| WO | 2015141831 A1 | 9/2015 |

* cited by examiner

MEASURING INSERT HAVING A PROTECTIVE TUBE

CROSS-REFERENCE TO RELATED APPLICATIONS

The present application is related to and claims the priority benefit of German Patent Application No. 10 2018 111 167.3, filed on May 9, 2018, and International Patent Application No. PCT/EP2019/059524, filed on Apr. 12, 2019, the entire contents of which are incorporated herein by reference.

TECHNICAL FIELD

The invention relates to a device for determining and/or monitoring at least one process variable of a medium. The medium is preferably located in a container, for example a tank or a pipe. The device comprises a measuring insert with at least one sensor element, in particular arranged in an end region of the measuring insert, for sensing the process variable, and a dipping body for receiving the measuring insert, which dipping body protrudes at least temporarily and/or partially into the medium, and which dipping body surrounds the measuring insert at least in a subregion facing the medium, in which the at least one sensor element is preferably located. The sensor element is, for example, a temperature sensor, which is used for sensing the process variable of temperature.

BACKGROUND

Thermometers are known from the prior art in a great variety of embodiments. Thus there are thermometers which use the expansion of a liquid, a gas or a solid with a known coefficient of expansion in order to measure temperature, or also others which relate the electrical conductivity of a material, or a quantity derived therefrom, to the temperature, such as electrical resistance when using, for example, resistance elements, or the thermoelectric effect in the case of thermocouples. On the other hand, radiation thermometers, in particular pyrometers, use the heat radiation of a substance to determine its temperature. The underlying measurement principles have each been described in a variety of publications.

In the case of a temperature sensor in the form of a so-called thin-film sensor, in particular a resistance temperature detector (RTD), for example, a sensor element provided with connecting wires and mounted on a carrier substrate is used, wherein the back of the carrier substrate usually has a metal coating. As sensor elements, so-called resistance elements, for example, in the form of platinum elements, are used, which among other things are also commercially available under the designations PT10, PT100, and PT1000.

The resistance elements are often introduced by means of a soldering process into a sensor head, for example a sensor tip, and in particular onto the inner floor of a sleeve consisting, for example, of stainless steel. In many cases a so-called SMD soldering process is carried out, in which firstly a solder is applied to a first component and then a second component is placed thereupon and soldered to the first component by heating. For the example of a sensor head of a resistance thermometer, first a defined amount of solder in the solid state ("solder pad") is usually introduced into the sensor head and fused to the inner floor of the sensor head by heating. The sensor element is then dipped into the solder with its metallized side and in this way soldered inside the sensor head. Methods for producing such a solder connection for a thermometer have become known, for example, from the first publication of application document DE102006048448A1 and from the previously unpublished German patent application DE102015112199A1. In principle, in the case of a corresponding resistance thermometer, the solder connection has a great influence on the thermal properties of the thermometer, in particular on the thermal coupling between resistance element and sensor head. Corresponding thermometers are, for example, produced and marketed by the applicant under the name Quicksens.

As an alternative to such thermometers in which the resistance element is soldered to the sensor head, numerous thermometers have become known in which the temperature sensors are enclosed and/or encapsulated, in particular in ceramic powders, such as magnesium oxide (MgO) or aluminum oxide ($Al_2O_3$), or in an, in particular curing, ceramic casting. This procedure serves firstly to secure the temperature sensors. Encapsulation, for example in a ceramic powder, also ensures that even at high temperatures, in particular at temperatures of, for example, up to 600° C., the connecting lines of the temperature sensor are isolated from each other and from the housing of the sensor head, in particular of a sensor tip, this often being made of a metal or a metal alloy. A method for producing a thermometer designed in this way has become known, for example, from the first publication of the application document DE02329239A1. In order to cast a temperature sensor, at least one predeterminable quantity of a first and a second component of a casting compound is introduced into a casting mold, in particular a sensor tip. The sensor tip is then shaken and/or made to vibrate at a predeterminable frequency. Thermometers of this type are also manufactured and sold by the applicant, and are, for example, called Strongsens.

For determining and/or monitoring the temperature of the medium in question, the sensor element is brought into thermal contact with the medium at least partially and/or temporarily by means of the dipping body. A heat exchange takes place between the device and the medium until a thermal equilibrium is established. When there is thermal equilibrium, the sensor element, the dipping body and the medium will have essentially the same temperature, hereinafter referred to as the equilibrium temperature. Until this equilibrium is reached, a heat propagation from the medium to the device or vice versa takes place. In this context, heat propagation is understood to mean a heat flow not only from the medium to the temperature sensor, corresponding to the case in which the medium has a higher temperature than the thermometer, but also in the opposite direction, in the case in which the thermometer has a higher temperature. The time it takes for a thermal equilibrium to be established after a temperature change $\Delta T$ of the medium correlates here with the response time of the thermometer. In this case, the response time basically depends on the structure of the device, on the thermal conductivities of the materials used in each case, and on the respective geometric design and on the quality of contacts existing between different materials.

Now it is the case that sensor elements or measuring inserts of thermometers are often introduced into a dipping body, in particular a protective tube. Such thermometer protection tubes, which can, for example, be made of ceramic or metallic materials, are often used in order to improve the resistance of the measuring insert to chemicals, abrasion, corrosion or extreme temperatures. In process measuring technology, this is of great importance in particular in sectors of the chemical or oil industries or in the field of power stations, etc. However, depending on the design, an error-free function may in certain circumstances require the measuring insert to rest on the bottom of the protective tube. Only then will heat be quickly transferred thermally from the process to the temperature-dependent sensor element that is arranged in the measuring insert. In terms of the design, the tip of the measuring insert is therefore pressed against the protective tube bottom by springs in order to ensure, for example, a metal-to-metal contact. The available spring travel is usually approximately 8-10 mm.

The design and requirements applying to these thermometers are determined, for example, by VDINDE 3511 Part 5 'Technical temperature measurements' and DIN 43772 'Protective tubes and extension tubes for [ . . . ] thermocouples and resistance thermometers'.

However, various errors can occur during installation or assembly of a corresponding thermometer. An unsuitable dimensioning of the measuring insert length with respect to the protective tube length, unsuitable seals or faulty installation can result in the spring travel being insufficient to press the measuring insert against the bottom. The lack of metallic contact leads to a considerable reduction in the measurement accuracy and an increase in the response time of the thermometer to a temperature change in the medium. From the prior art it has become known, for example, to use so-called spring screws to ensure good contact, these spring screws pressing the measuring insert against the bottom of the protective tube when the measuring insert is screwed into a head housing. In this regard, reference may be made, for example, to the thermometer sold by the applicant under the name iTemp. Furthermore, documents DE102013114140A1 or DE102014101968A1 describe the use of further spring elements for improving the contact between the protective tube and the measuring insert.

In spite of the described measures, with such a design it is not easy to check whether contact between the measuring element and the protective tube is good enough. A further problem is the dimensioning of the protective tube and that of the measuring insert. It usually cannot be avoided that at least a small air gap remains between an outer wall of the measuring insert and an inner wall of the protective tube, this having a disadvantageous effect on the measurement performance of the thermometer.

SUMMARY

The present invention is therefore based on the object of improving the response times of measurement devices with measuring inserts, which are arranged at least partially in a dipping body.

This object is achieved by a device for determining and/or monitoring the at least one process variable of a medium, comprising a measuring insert having at least one sensor element, in particular arranged in an end region of the measuring insert, for sensing the process variable, and a dipping body for receiving the measuring insert, which dipping body protrudes at least temporarily and/or partially into the medium, and which dipping body surrounds the measuring insert at least in a subregion facing the medium in which the at least one sensor element is preferably located.

According to the invention, at least one coupling unit is provided which can be introduced into the dipping body and which is designed to fill up an internal volume between an inner wall of the dipping body and an outer wall of the measuring insert at least in the subregion in which the sensor element is located and to ensure a mechanical coupling between the dipping body and the measuring insert.

The device may further comprise, for example, at least one electronics module which is used for signal processing and/or the signal feed. For example, the process variable is the temperature of a medium and the sensor element is a temperature sensor. The temperature sensor can then be designed, for example, in the form of a thermocouple or in the form of a resistance element. The dipping body can, in turn, be a protective tube which protects the temperature sensor from a direct contact with the medium, for example.

The solution according to the invention makes it possible to overcome the described problems with regard to thermal conductivity within the device and going along with this the achievable measuring accuracy as well as the corresponding response time of the thermometer. By the use of a coupling unit according to the invention, a good thermal coupling, that is to say a good thermal contact, can be ensured between the measuring insert and the dipping body. In particular, it is ensured that there is no air gap between an outer wall of the measuring insert and an inner wall of the dipping body.

Numerous possibilities are conceivable regarding the design of the coupling unit, all of which fall under the present invention. The precise development is here dependent among other things on various specifications regarding the measuring device, that is to say also on the respective geometric situation. Some particularly preferred developments are described by way of example below. It goes without saying that these different developments can in each case also be combined with one another.

In one development of the device according to the invention, the coupling unit comprises a solid lubricant, in particular graphite, boron nitride, copper, or brass. It has become known from the prior art for so-called heat-transfer compounds to be arranged between the measuring insert and the dipping body. However, these have the disadvantage that the respective thermal contact between the measuring insert and the dipping body is not easily reproducible and the quality of the contact is not constant, for example as a result of progressive corrosion. Solid lubricants offer the advantage that they can be introduced into the dipping body more easily and above all precisely and reproducibly. They are also suitable in particular for compensating for shape tolerances of an outer wall of the measuring insert and an inner wall of the dipping body. A reproducible thermal contact between dipping body and measuring insert can thus be achieved.

In one development, the coupling unit is designed in the form of a powder. The powder can, for example, be introduced into the dipping body before the measuring insert is integrated.

Alternatively, however, the coupling unit can be designed in the form of a coating, for example. This can in turn be applied to an inner wall of the dipping body or to an outer wall of the measuring insert before the measuring insert is arranged in the dipping body. Finally, a further alternative of the device according to the invention includes the coupling unit taking the form of a solid body, in particular the form of a film or as a tubular body. In the installed state of the measuring insert, the body is dimensioned in such a way that it can be introduced into the dipping body, in particular in a precisely fitting manner, an intermediate space in which an air gap would otherwise form. It is thus adapted to the dimensioning of the dipping body and to that of the measuring insert.

A preferred development of the device according to the invention comprises the coupling unit being designed in such a way that it ensures a thermal coupling between the dipping body and the measuring insert at least in the subregion in which the sensor element is located.

A further development of the device according to the invention comprises the coupling unit being designed such that it damps vibrations of the dipping body and/or of the measuring insert that occur. In the event that the device is exposed to vibrations occurring during continuous operation, these may lead to damage of the measuring insert arranged in the dipping body. The coupling unit is correspondingly preferably designed in such a way that it also improves a mechanical coupling of the measuring insert and of the dipping body. For example, the coupling unit can be designed in such a way that it prevents movements of the measuring insert relative to the dipping body, in particular in the radial direction. In this way, shock movements of the measuring insert against the dipping body caused by the vibrations can be prevented.

A further preferred development includes the coupling unit being designed in such a way that it enables an, in particular reversible, movement of the measuring insert relative to the dipping body, in particular in the axial direction. At least partially different materials, in particular with different coefficients of thermal expansion, are normally used for the measuring insert and the dipping body. As a result of temperature changes in the medium, different expansions of the measuring insert and dipping body then occur, in particular in the longitudinal direction. The coupling unit is then preferably designed such that it compensates for the different, in particular reversible, expansions resulting from changes in temperature, in particular in the longitudinal direction. In this way, a thermal contact between the dipping body and the measuring insert which remains consistent independent of the temperature can be ensured.

It is advantageous if the coupling unit is mounted inside the dipping body. In this case, the measuring insert can be removed from the dipping body, for example as a result of a replacement, without needing to remove the coupling unit.

In one development, the coupling unit, the dipping body and/or the measuring insert have at least one fastening means for fastening the coupling unit in the internal volume of the dipping body. The fastening unit provides in particular for a mounting of the coupling unit inside the dipping body.

In this respect, various developments are conceivable, some preferred variants of which are given below:

For example, one development comprises an inner wall of the dipping body having a shoulder serving as a fastening means, wherein the inner diameter of the dipping body in a subregion facing the medium is greater than the inner diameter of the dipping body in a subregion facing away from the medium. When the measuring insert is removed, a movement of the coupling unit in the axial direction is prevented by the shoulder on the inner wall of the dipping body.

It is also conceivable for an inner wall of the dipping body to have a projection which serves as a fastening means, the inner diameter of the dipping body in the region of the projection being reduced in comparison to the subregion facing the medium.

Further developments provide that the fastening means is an, in particular mechanical, snug connection, in particular that the fastening means has at least one snap ring or a fitting ring, that the fastening means is an adhesive, or that the fastening means is at least partially made of a sintered material.

BRIEF DESCRIPTION OF THE DRAWINGS

The invention is explained in more detail based upon the following drawings. These show.

In the figures, the same features are identified with the same reference symbols.

DETAILED DESCRIPTION

Figure 1:
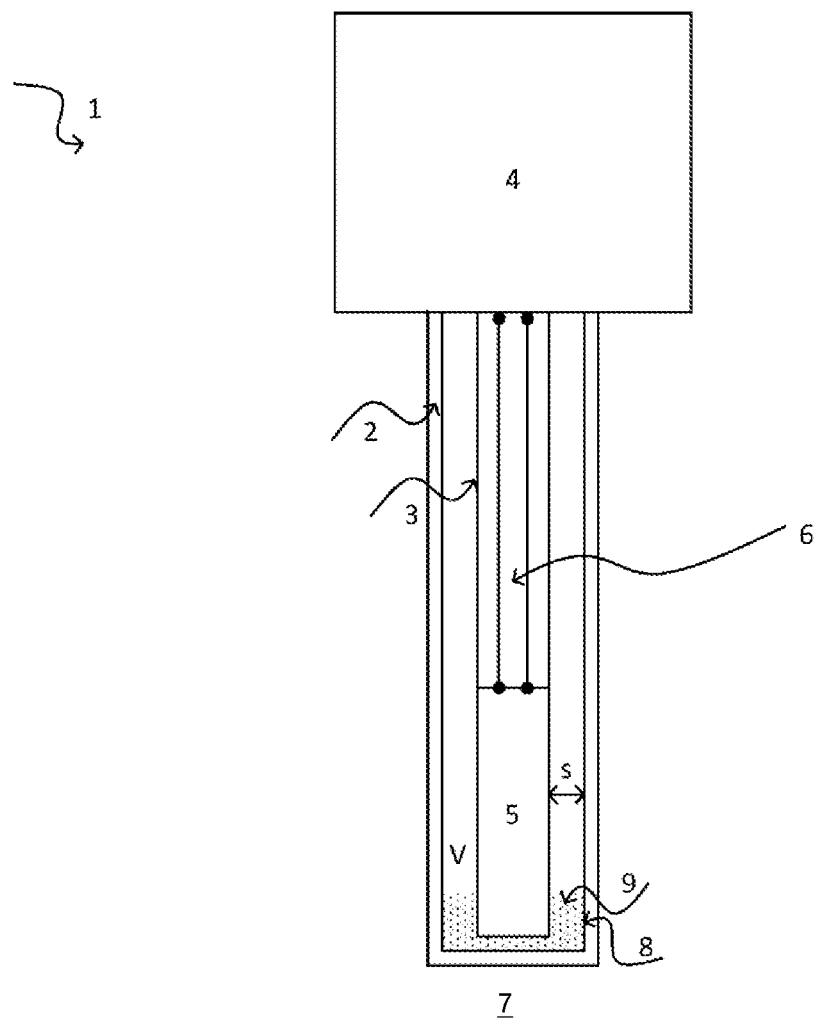
FIG. 1 shows a thermometer having a measuring insert and a protective tube according to prior art.

FIG. 1 shows a schematic representation of a thermometer 1 with a dipping body 2, a measuring insert 3, and an electronics module 4 according to the prior art. The measuring insert 3 is introduced into the dipping body 2 and comprises a sensor element 5 which in the present case is a temperature sensor in the form of a resistance element, which is contacted electrically and is connected to the electronics module 4 via the connecting lines 6. In other developments, the electronics module 4 can also be arranged separately from the measuring insert 3 and dipping body 2. In addition, the sensor element 5 need not necessarily be a resistance element, nor does the number of connecting lines 6 used need necessarily be two. It is rather the case that, depending on the measurement principle used, a different number of connecting wires 6 can be used.

As already explained, the measuring accuracy, in particular the response time, of such a thermometer 1 depends to a large extent on the materials in question and on contacts, in particular thermal contacts, in particular in the region of the temperature sensor 5. The temperature sensor 5 is in thermal contact with the medium 7 indirectly, i.e., via the dipping body 2. A spring element (not shown) is often used in the prior art in order to ensure an adequate mechanical, and thus a thermal, contact between the dipping body 2 and the measuring insert 3, in particular the temperature sensor 5. In addition, it is possible to fill an internal volume V of the dipping body 2 at least in a subregion 8 partially surrounding the temperature sensor 5 with a heat-transfer compound 9. However, no consistent contact between the temperature sensor 5 and the dipping body 2 can be ensured by such measures. Frequently, for example, an air gap S remains, which can lead to a significant reduction in the response time and/or the measuring accuracy of the thermometer 1.

This problem is addressed by the present invention by the use of a coupling unit 10 which is insertable into the dipping body 2. For the design of the coupling unit 10 numerous possibilities are conceivable, of which some preferred developments are described as examples below. In this case, the precise design depends, among other things, on various specifications applicable to the measuring device 1 and thus also on the particular geometric situation.

The coupling unit 10 according to the invention is basically designed to fill up an internal volume V between an inner wall of the dipping body 2 and an outer wall of the measuring insert 3 at least in the subregion T in which the sensor element 5 is located and to ensure a mechanical coupling between the dipping body 2 and the measuring insert 3. The coupling unit 10 thus serves to improve the thermal conductivity within the thermometer 1 and thus along with this the achievable measuring accuracy and the respective response time.

Figure 2:
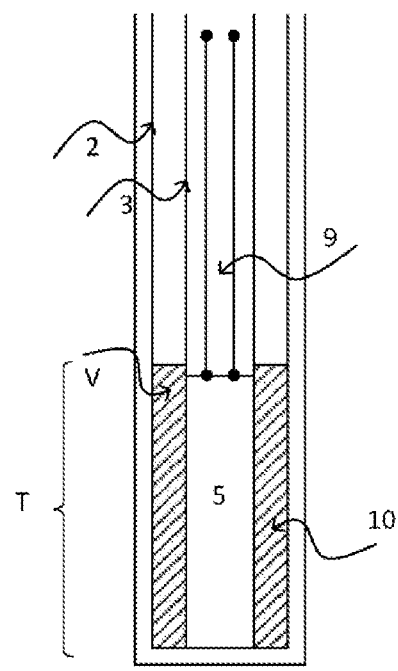
FIG. 2 shows a first development of a device according to the present disclosure with a coupling unit.

A possible development for a thermometer 1 according to the invention is the subject matter of FIG. 2. The coupling unit 10 fills the internal volume V between the dipping body 2 and the measuring insert 3 in the region of the sensor element 5. The coupling unit 10 thus brings about a mechanical, and thus a thermal, coupling between the dipping body 2 and the measuring insert 3. A good and consistent thermal contact between the dipping body 2 and the measuring insert 3 can be ensured. For example, the occurrence of the air gap S previously described can be prevented.

The coupling unit 10 preferably comprises a solid lubricant, in particular graphite, boron nitride, copper, or brass. Different variants are conceivable for the precise design. For example, the coupling unit 10 can be designed in the form of a powder, in the form of a coating, or as a solid body. Depending on the development, the measuring insert 3 is either introduced first into the dipping body 2 before the coupling unit 10 is added. Alternatively, it can be advantageous for other developments if the coupling unit 10 is introduced into the dipping body 2 first and then the measuring insert 3.

In a possible development of a device 1 according to the invention, the coupling unit 10 is mounted inside the dipping body 2. It goes without saying that other developments can also include mounting the coupling unit in the region of the measuring insert 3. However, such developments, also covered by the present invention, are not discussed in detail in the context of the figures shown here.

FIG. 3 shows, by way of example, two possible developments of a device 1 according to the invention in which the coupling unit 10 is mounted inside the dipping body 2. For this purpose, the device 1 comprises a fastening means 11 for fastening the coupling unit. In the developments shown, the fastening means 11 is in each case part of the dipping body 2. In other developments not shown here, however, the fastening means 11 can also take the form of a separate unit, or be part of the coupling unit 10, or even be part of the measuring insert 3 or of the dipping body 2.

Figure 3A:
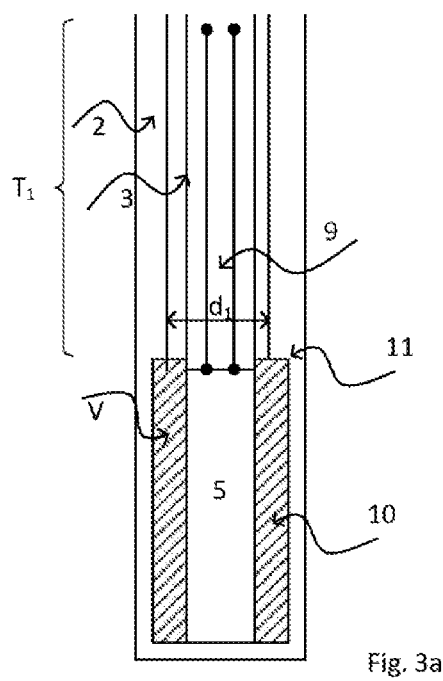
FIGS. 3a and 3b show further embodiments of a device according to the present disclosure with a coupling unit in which the coupling unit is mounted inside the dipping body.
Figure 3B:
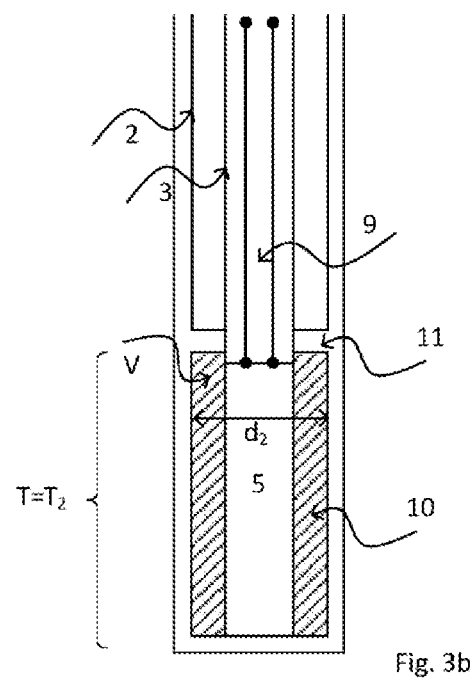

According to the development according to FIG. 3a, the inner wall of the dipping body 2 has a shoulder. As a result the inner diameter $d_1$ of the dipping body 2 in a subregion $T_1$ facing away from the medium is smaller than the inner diameter $d_2$ in a subregion $T_2$ facing the medium. The shoulder ensures that the coupling unit 10 is mounted in the subregion $T=T_2$. FIG. 3b shows a second possible development of the fastening means 11. According to FIG. 3b, the inner wall of the dipping body 2 has a projection which serves as a fastening means 11. The inner diameter of the dipping body 2 in the region of the projection is reduced in comparison with the inner diameter $d_2$ in the subregion $T_2$ facing the medium 7. In both cases, the fastening means prevents, in particular, an axial movement of the coupling unit 10, for example in the event of the measuring insert 3 being removed from the dipping body 2 or introduced into the dipping body 2.

The invention claimed is:

1. A device for determining and/or monitoring at least one process variable of a medium, the device comprising:

a measuring insert, including a sensor element disposed in an end region of the measuring insert and configured to detect the at least one process variable;

a dipping body in form of a protective tube configured to receive the measuring insert and at least temporarily and/or partially protrude into the medium, wherein the dipping body surrounds the measuring insert at least in a subregion adjacent the medium in which the sensor element is disposed; and a coupling unit adapted to be introduced into the dipping body and configured to fill an internal volume between an inner wall of the dipping body and an outer wall of the measuring insert at least in the subregion in which the sensor element is disposed as to enable a mechanical coupling and a thermal coupling between the dipping body and the measuring insert and such that no air gap exists between the outer wall of the measuring insert and the inner wall of the dipping body, wherein the coupling unit is a solid body comprising a solid lubricant, wherein the solid lubricant is graphite, and wherein the coupling unit is configured to be mounted inside the dipping body such that the measuring insert is removable from the dipping body without needing to remove the coupling unit.

2. The device of claim 1, wherein the coupling unit is a coating.

3. The device of claim 1, wherein the coupling unit is a solid body in the form of a film or as a tubular body.

4. The device of claim 1, wherein the coupling unit is configured to dampen vibrations of the dipping body and/or of the measuring insert.

5. The device of claim 1, wherein the coupling unit is configured to enable reversible movement of the measuring insert relative to the dipping body in an axial direction of the measuring insert.

6. The device of claim 1, wherein the coupling unit and/or the dipping body include a fastening feature for fastening the coupling unit in the internal volume of the dipping body.

7. The device of claim 6, wherein the fastening feature is a shoulder in the inner wall of the dipping body, wherein a first inner diameter of the dipping body in the subregion adjacent the medium is greater than a second inner diameter of the dipping body in another subregion opposite the medium.

8. The device of claim 6, wherein the fastening feature is a projection from the inner wall of the dipping body, wherein a first inner diameter of the dipping body in a region of the projection is reduced relative to the subregion adjacent the medium.

9. The device of claim 6, wherein the fastening feature is a mechanical, snug connection.

10. The device of claim 9, wherein the fastening feature includes at least one snap ring or a fitting ring.

11. The device of claim 6, wherein the fastening feature is an adhesive.

12. The device of claim 6, wherein the fastening feature is made at least partially of a sintered material.

\* \* \* \* \*